United States Patent [19]

Markus

[11] 4,387,462
[45] Jun. 7, 1983

[54] SINGLE-FREQUENCY STABILIZED LASER

[76] Inventor: Joseph Markus, 2211 D Fortune Dr., San Jose, Calif. 95131

[21] Appl. No.: 274,097

[22] Filed: Jun. 16, 1981

[51] Int. Cl.³ .............................................. H01S 3/13
[52] U.S. Cl. ....................................... 372/32; 372/33; 372/34
[58] Field of Search ....................... 372/34, 29, 98, 61, 372/26, 32, 33

[56] References Cited

U.S. PATENT DOCUMENTS 3,516,010  6/1970  Rasch et al. ........................... 372/33

Primary Examiner—William L. Sikes
Assistant Examiner—Leon Scott, Jr.
Attorney, Agent, or Firm—Parmelee, Bollinger & Bramblett

[57] ABSTRACT

A single frequency stabilized laser which is useful in long base line interferometers, optical inspection devices and other applications requiring a single-frequency laser source is provided having a cold-cathode and a hard-sill glass laser tube. A resistance coating, for example, Aquadag, covers the exterior surface of a laser tube which is mounted on a metallic base member. A small power supply which energizes the resistance coating for serving as a heater is coupled to this coating by fine wires, embedded in silver epoxy, for heating the glass laser tube to stabilize the frequency of the tube and eliminate mode changes in the operation thereof. A temperature sensor is provided for monitoring the temperature of the tube and is coupled to a temperature controller which controls the power supply for controlling the current applied to the resistance coating on the tube via the fine wires. Accordingly, the temperature of the tube is continuously monitored and controlled for stabilizing the frequency of the laser. Advantageously, the stabilized laser of the present invention is considerably less expensive than the previous commercially available stabilized lasers.

7 Claims, 1 Drawing Figure

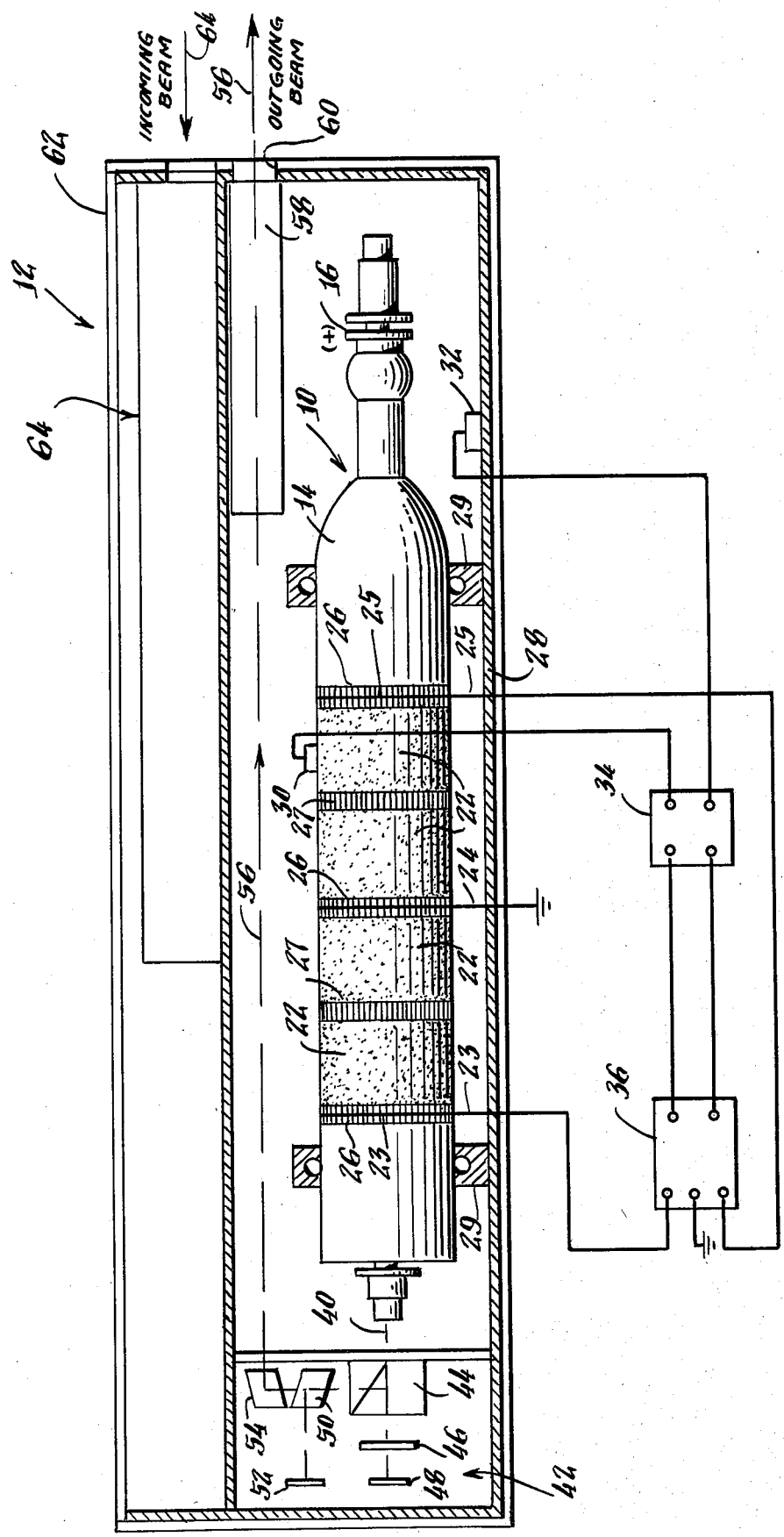

SINGLE-FREQUENCY STABILIZED LASER

BACKGROUND OF THE INVENTION

This invention relates to a single-frequency stabilized laser, and more particularly to such a laser whose tube temperature is constantly monitored and controlled for stabilizing the laser output.

Many applications require a single-frequency laser source which may be utilized in such applications as long base line interferometers, optical inspection devices and other applications requiring high spectral purity. Such sources are provided by the expensive lamb dip laser or the so-called "frequency grasping type". These prior art devices are complex as well as expensive.

SUMMARY OF THE INVENTION

Accordingly, it is an object of this invention to provide a new and improved stabilized, single-frequency laser source which is comparable in performance while being less complex and less expensive than prior art devices.

In carrying out this invention, in one illustrative embodiment thereof, a single-frequency stabilized laser source is provided with a glass tube having a resistance coating on an exterior surface thereof with the laser tube being mounted on a base member. A power supply is provided which is coupled to the resistance coating on the laser tube for heating the glass laser tube to stabilize the frequency and eliminate mode changes in the operation of the laser. Temperature sensor means are provided for monitoring the temperature of a laser tube. A temperature controller having the temperature sensor means coupled thereto is connected to the power supply for controlling the current supplied therefrom and applied to the coating, whereby the temperature of the laser tube is continuously monitored and controlled.

Advantageously, the closed-loop temperature control of the laser tube stabilizes the laser source in a non-complex, economical and easy to control apparatus.

BRIEF DESCRIPTION OF THE DRAWING

The invention, together with further aspects, objects, advantages and features thereof will be better understood from a consideration of the following description taken in conjunction with the accompanying drawing.

The drawing is a diagrammatic and schematic illustration of a single-frequency stabilized laser embodying the present invention illustrated as used in an interferometer.

DESCRIPTION OF THE PREFERRED EMBODIMENT

Referring now to the drawing, the frequency stabilized laser is indicated generally by the reference number 10 and is shown incorporated in an interferometer unit 12. The frequency stabilized laser includes a laser tube 14 of suitable heat resistant material, for example, such as Pyrex glass frosted on the outside, with an anode 16 and an internal cylindrical cold cathode (not shown). For example, this tube 14 may be a Hughes coaxial tube. Between the anode and the cathode is applied a source of direct current potential (not shown) of a suitable value, for example, 7,000 volts d.c. for firing the laser, which normally operates at 1,000 volts d.c. at 4 milliamperes.

For the particular application illustrated, a helium neon gas laser may be employed having a single-frequency output of 6328 Angstroms. The laser tube 14 is a cold-cathode type tube with an internal coaxial Pyrex glass rod having a longitudinal internal small bore of a diameter on the order of 1 millimeter providing a diffraction limited output beam of approximately 1 mm in diameter.

In accordance with the present invention, the temperature of the laser tube 14 is electrically controlled in order to stabilize the laser to operate at a single frequency. In order to electrically control the temperature of the tube 14, a resistance blanket is provided on the exterior of this tube by applying a suitable resistance coating 22 onto the frosted outside surface of the tube 14. For example, this resistance coating may be a coating of Aquadag, which is a colloidal suspension of fine particles of graphite in solution which is applied and baked on the tube. A plurality of fine wires 23, 24, 25, for example, three wires, are electrically connected to this resistance coating 22 by imbedding these fine wires in a conductive paint band 26 which encircles the tube 14. This conductive paint band, for example, is formed by silver epoxy, thereby providing electrical connections to the resistance coating 22 to enable the feeding of electric current through the coating 22 for heating the tube. In order to distribute the electric current more uniformly through the resistance coating 22, there are intermediate conductive paint bands 27 encircling the tube 14 approximately mid-way between the respective connection-forming conductive bands 26.

The tube 14 is mounted by metal mounts 29 to a metal base 28. The metal mounts 29 and base 28 may be of any suitable metal of good heat conductivity, for example, such as aluminum.

In order to control the temperature of the laser tube 14, a plurality of temperature sensors are mounted at various locations. A first temperature sensor 30 is mounted in the tube 14 in a region containing the coating 22 for directly sensing the heater temperature on the tube.

Another temperature sensor 32 is mounted on the base 28 to monitor its temperature, and this base is in good heat conductivity relationship with the laser tube 14. The temperature sensors may be of any suitable type, for example, thermistor sensors. Sensors 30 and 32 are electrically connected to a temperature controller 34 which in turn, is electrically connected to and controls a power supply 36. This power supply delivers a small d.c. voltage, e.g., on the order of ±12 volts. The power supply 36 is connected to the fine wires 23 and 25 which are in electrical contact with the respective conductive bands 26 near opposite ends of the tube 14. The wire 25 in contact with the central conductive band 26 is grounded. Thus, electrical current is fed uniformly through the conductive coating 22, such current flowing longitudinally along the tube surface in this resistance coating. The multiple conductive bands 26 and 27 advantageously produce a uniform current distribution so that a desirable uniform heating effect is produced.

The temperature of the tube 14 and the base 28 are thus precisely monitored for controlling the heating of the glass tube 14 in order to achieve a uniform and stable tube temperature to prevent mode changes and to eliminate multimoding of the laser beam. As pointed out previously, a heat resistant glass such as Pyrex is desirable, because it is durable, stable and heats without flexing unduly, which provides the desired results in stabilizing the laser beam. This hard-sill tube 14 has the laser mirrors at each end oriented perpendicular to the axis of the tube.

The laser tube 14 is a hard-sill tube with mirrors at each end. The emerging laser beam 40 is applied to a laser analyzer, referred to generally by the reference 42, which includes a 60/40 polarizing beam splitter 44, a rotatable polarizer plate 46 and a silicon photocell 48. The laser beam 40 is applied from the beam splitter 44 to a 90%/10% beam splitter 50 which causes 10% of the beam to be directed to a second photocell 52. The beam is then applied to a 100% reflector 54 which reflects the outgoing beam 56 through a telescope collimator 58, the outgoing beam exiting through a port 60 in the unit housing 62. The rotatable polarizer plate 46 is used to balance the outputs measured by the silicon photocells 48 and 52 which monitor the output level. The outgoing beam 56 is a positive polarized single-frequency beam.

The incoming beam 64 which is being analyzed by the interferometer is applied to a plurality of fringe counter circuits at 66 and further processed in a conventional manner which is not described here, as it does not constitute a part of the present invention.

In accordance with the present invention, a very simple closed loop arrangement is provided for controlling the temperature of a cold-cathode, hard-sill laser tube for obtaining a single-frequency output which is stable.

The heating apparatus as described, requires a warm-up time of approximately three minutes, after which the frequency is stabilized and locked in, and the unit 12 is ready for operation. The temperature of the tube is constantly monitored along with that of its support structure, in order to maintain frequency stabilization once the frequency has been locked in. This arrangement is considerably simpler and less expensive than previous lasers, for example, the lamb dip laser tube as well as the "frequency grasping type" stabilized laser.

Since other changes and modifications varied to fit particular operating requirements and environments will be apparent to those skilled in the art, the invention is not considered limited to the example chosen for purposes of illustration, and covers all changes and modifications which do not constitute a departure from the true spirit and scope of this invention.

What is claimed is:

1. A single-frequency stabilized laser having a cold-cathode, hard-sill glass laser tube comprising:
    a resistance coating on the exterior surface of said laser tube,
    a base member,
    means for mounting said laser tube on said base member,
    a power supply,
    means for connecting said power supply to said resistance coating on said laser tube for heating said glass laser tube to stabilize the frequency and eliminate mode changes in the operation of said laser tube,
    temperature sensor means mounted in said laser tube for monitoring the temperature of said laser tube,
    temperature controller means having said temperature sensor means connected thereto, and
    said temperature controller being connected to said power supply for controlling the current applied to said coating, whereby the temperature of said laser tube is continuously monitored and controlled.

2. The single-frequency stabilized laser as set forth in claim 1, in which said means for connecting said power supply to said resistance coating includes a conductive band of paint.

3. The single-frequency stabilized laser as set forth in claim 1, in which said base member and said means for mounting said tube on said base member are formed of metal of good heat conductivity.

4. The single-frequency stabilized laser as set forth in claim 1, wherein said temperature sensor means includes a sensor mounted directly on said resistance coating on the exterior surface of said tube.

5. The single-frequency stabilized laser as set forth in claims 1, 3 or 4, in which said temperature sensor means includes a sensor mounted on said metal base member.

6. The single-frequency stabilized laser as set forth in claim 1, in which said means for connecting said power supply to said resistance coating include a plurality of conductive connection bands encircling the tube and longitudinally spaced along the tube.

7. The single-frequency stabilized laser as set forth in claim 6, in which intermediate conductive bands encircle said tube in contact with said resistance coating and are positioned between but spaced from said connection bands for providing uniform distribution of current flow through said resistance coating.

* * * * *